US011122003B1

(12) United States Patent
Garg et al.

(10) Patent No.: US 11,122,003 B1
(45) Date of Patent: Sep. 14, 2021

(54) METHODS AND APPARATUS FOR APPLICATION AGNOSTIC FEDERATION SERVICE TO FACILITATE CROSS CONNECTIVITY OF MESSAGING AND COMMUNICATIONS PLATFORMS

(71) Applicant: Envite Inc., Fremont, CA (US)

(72) Inventors: Rajeev Garg, Livermore, CA (US); Lakshmanan Venugopalan, Fremont, CA (US)

(73) Assignee: Envite Inc., Fremont, CA (US)

( * ) Notice: Subject to any disclaimer, the term of this patent is extended or adjusted under 35 U.S.C. 154(b) by 0 days.

(21) Appl. No.: 16/236,260

(22) Filed: Dec. 28, 2018

Related U.S. Application Data

(60) Provisional application No. 61/614,330, filed on Jan. 5, 2018.

(51) Int. Cl.
*H04L 12/58* (2006.01)
*G06F 16/909* (2019.01)
*H04L 29/08* (2006.01)

(52) U.S. Cl.
CPC ............ *H04L 51/36* (2013.01); *G06F 16/909* (2019.01); *H04L 51/046* (2013.01); *H04L 51/14* (2013.01); *H04L 51/20* (2013.01); *H04L 51/28* (2013.01); *H04L 67/306* (2013.01)

(58) Field of Classification Search
CPC ....... H04L 51/36; H04L 51/046; H04L 51/14; H04L 51/20; H04L 51/28; H04L 67/306; G06F 16/909
USPC .......................................................... 709/206
See application file for complete search history.

(56) References Cited

U.S. PATENT DOCUMENTS

| | | | | | |
|---|---|---|---|---|---|
| 6,035,104 | A | * | 3/2000 | Zahariev | H04L 51/14 379/100.08 |
| 9,197,588 | B2 | * | 11/2015 | Chen | H04L 51/046 |
| 9,438,554 | B2 | * | 9/2016 | Fleck | G06Q 10/10 |
| 9,646,325 | B2 | * | 5/2017 | DeWitt | A63F 13/35 |
| 10,097,486 | B1 | * | 10/2018 | Rosen | H04W 8/18 |
| 10,439,979 | B2 | * | 10/2019 | Zucker | H04L 51/36 |

(Continued)

OTHER PUBLICATIONS

U.S. Appl. No. 62/535,031, Specification and drawings, filed Jul. 20, 2017 (Year: 2017).*

(Continued)

*Primary Examiner* — David P Zarka
(74) *Attorney, Agent, or Firm* — Adibi IP Group, PC; Amir V. Adibi; Andrew C. Palmer

(57) ABSTRACT

Methods and apparatus for application agnostic federation service to facilitate cross connectivity of messaging and communications platforms are described. In an embodiment, a method is provided for operating a cross-messaging platform to communicate messages between a first user registered on a first messaging platform and a second user registered on a second messaging platform. The method includes registering the first user, receiving a request from the first user to connect with the second user, and sending an invitation to the second user to connect with the first user. The method also includes registering the second user if the second user accepts the invitation, and establishing a communication channel between the first messaging platform and the second messaging platform so that communication between the first and second users occur using the communication channel.

19 Claims, 17 Drawing Sheets

COMMUNICATION USING ENVITE SYSTEM

(56) References Cited

U.S. PATENT DOCUMENTS

| | | | |
|---|---|---|---|
| 10,439,980 B2* | 10/2019 | Watson | H04L 67/14 |
| 2004/0128352 A1* | 7/2004 | Srinivas | H04L 51/04 |
| | | | 709/204 |
| 2008/0040437 A1* | 2/2008 | Agarwal | H04L 51/04 |
| | | | 709/206 |
| 2013/0091204 A1* | 4/2013 | Loh | G06F 16/958 |
| | | | 709/204 |
| 2014/0304348 A1* | 10/2014 | Libman | H04L 51/36 |
| | | | 709/206 |
| 2016/0295009 A1* | 10/2016 | Torres | H04M 1/72522 |
| 2018/0026805 A1* | 1/2018 | Ho | H04L 12/1818 |
| | | | 709/204 |
| 2018/0048618 A1* | 2/2018 | Fletcher | G06Q 10/107 |
| 2018/0063070 A1* | 3/2018 | Zucker | H04L 51/066 |
| 2018/0183738 A1* | 6/2018 | Parnell | G06F 3/0483 |
| 2018/0204157 A1* | 7/2018 | Li | G06Q 10/04 |
| 2018/0330308 A1* | 11/2018 | Ahmed | G06Q 10/063116 |
| 2019/0098139 A1* | 3/2019 | Crown | H04L 12/1822 |

OTHER PUBLICATIONS

U.S. Appl. No. 62/563,665, Specification and drawings, filed Sep. 27, 2017 (Year: 2017).*
U.S. Appl. No. 62/614,330, Specification and drawings, filed Jan. 5, 2018 (Year: 2018).*

* cited by examiner

ENVITE SYSTEM

COMMUNICATION USING ENVITE SYSTEM

DIAGRAM FOR MESSAGING A USER

DIAGRAM FOR FINDING A USER

DIAGRAM FOR FINDING A SERVICE

DIAGRAM FOR FINDING A SERVICE PROVIDER

DIAGRAM FOR BROADCASTING A SERVICE REQUEST

DIAGRAM FOR SETTING UP MESSAGE FORWARDING

DIAGRAM FOR PERFORMING MESSAGE FORWARDING

DIAGRAM FOR INTELLIGENT MESSAGE AND NOTIFICATIONS FORWARDING

DIAGRAM FOR PROVIDING MESSAGE FORWARDING

DIAGRAM FOR BROADCAST MESSAGE SETUP

DIAGRAM FOR MESSAGE BROADCAST

DIAGRAM FOR USER MESSAGING

DIAGRAM FOR INVITATION AND ACCEPTANCE FOR CONNECTING TWO USERS

DIAGRAM FOR SIMPLIFIED USER INVITATION

CONNECTION ENGINE

COGNITIVE ANALYZER ENGINE

POLICY ENGINE

ROUTER ENGINE

METHODS AND APPARATUS FOR APPLICATION AGNOSTIC FEDERATION SERVICE TO FACILITATE CROSS CONNECTIVITY OF MESSAGING AND COMMUNICATIONS PLATFORMS

CROSS-REFERENCE TO RELATED APPLICATIONS

This application claims the benefit under 35 U.S.C. § 119 of provisional application Ser. No. 62/614,330, entitled "Apparatus and Utility comprising of light weight federation service to facilitate cross connectivity of team messaging platforms", filed Jan. 5, 2018. The entirety of provisional application Ser. No. 62/614,330 is incorporated herein by reference.

TECHNICAL FIELD

The present invention relates to communication systems, and in particular, to cross-connectivity and federation of messaging and unified communication platforms.

BACKGROUND INFORMATION

In today's consumer and enterprise applications, users have an option to communicate with other users that are subscribed with the same application provider. To connect with a user from another application provider, either a new account needs to be created with the other provider, or a third-party is utilized to replicate messages across the applications. This current limitation of restricting communicating within an application provider shortens the scope of inter-communication for end users. This creates inconvenience and lack of interoperability, unlike email communication, where a user from one provider can communicate with users from another provider. As of today, there is no such generic option available for enterprise and consumer messaging or communication applications.

Therefore, it is desirable to have an easy to use system that provides efficient messaging and communications across multiple providers without changing their existing user experience.

SUMMARY

In various exemplary embodiments, an Envite system is disclosed that provides efficient messaging and communications across multiple providers.

In an exemplary embodiment of the Envite system, a user need only configure a single account to communicate with users subscribed to different application providers. The Envite system facilitates intelligent message forwarding, notifications, and communications, enabling users to leverage their preferred applications. Users will now have a new capability to search and communicate across multiple providers. This innovative system brings seamless connectivity for both consumer and enterprise applications.

In an exemplary embodiment, a method is provided for operating a cross-messaging platform to communicate messages between a first user registered on a first messaging platform and a second user registered on a second messaging platform. The method includes registering the first user, receiving a request from the first user to connect with the second user, and sending an invitation to the second user to connect with the first user. The method also includes registering the second user if the second user accepts the invitation, and establishing a communication channel between the first messaging platform and the second messaging platform so that communications between the first and second users occur over the communication channel using their existing platforms.

In an exemplary embodiment, a method is provided for operating a cross-messaging platform to communicate messages between a first user registered on a first messaging platform and a second user registered on a second messaging platform. The method includes receiving, at the cross-messaging platform, a request from the first user to find a service, searching a database of the cross-messaging platform to generate search results that include a plurality of service providers that provide the service, and broadcasting, from the cross-messaging platform, an invitation to the plurality of service providers to provide the service to the first user. The method also includes receiving, at the cross-messaging platform, an acceptance of the invitation from a selected service provider that is identified as the second user on the second messaging platform, and establishing, by the cross-messaging platform, a communication channel between the first messaging platform and the second messaging platform, wherein communications between the first and second users occur over the communication channel using their existing platforms.

In an exemplary embodiment, an apparatus is provided that communicates messages between a first user registered on a first messaging platform and a second user registered on a second messaging platform. The apparatus includes means for registering the first user, means receiving a request from the first user to connect with the second user, and means for sending an invitation to the second user to connect with the first user. The apparatus also includes means for registering the second user if the second user accepts the invitation, and means for establishing a communication channel between the first messaging platform and the second messaging platform so that communication between the first and second users occur over the communication channel using their existing platforms.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

In various exemplary embodiment, an Envite system is disclosed having methods and apparatus that operate to provide registered users a range of messaging benefits and features currently unavailable. The following is an exemplary though not exhaustive list of messaging features provided by the Envite system.

1. Users can retain current messaging providers and still collaborate with users from other messaging providers.
2. The system operates to route messages between various service providers.
3. The system provides search capability to allow a user to search for others not associated with the user's current messaging providers.
4. The system provides a subscription-based model for both service providers and users.
5. The system allows unsolicited notifications from businesses to users based upon subscription interest.
6. The system allows service providers to be connected on demand.
7. The system enables negotiation of services at low cost without having to go through third party applications or agents.
8. The system provides a virtual assistant for everyone.
9. The system provides a platform that can be easily extended to vertical services, such as customer support, education, meetings, and unified communications and collaboration.

Figure 1:
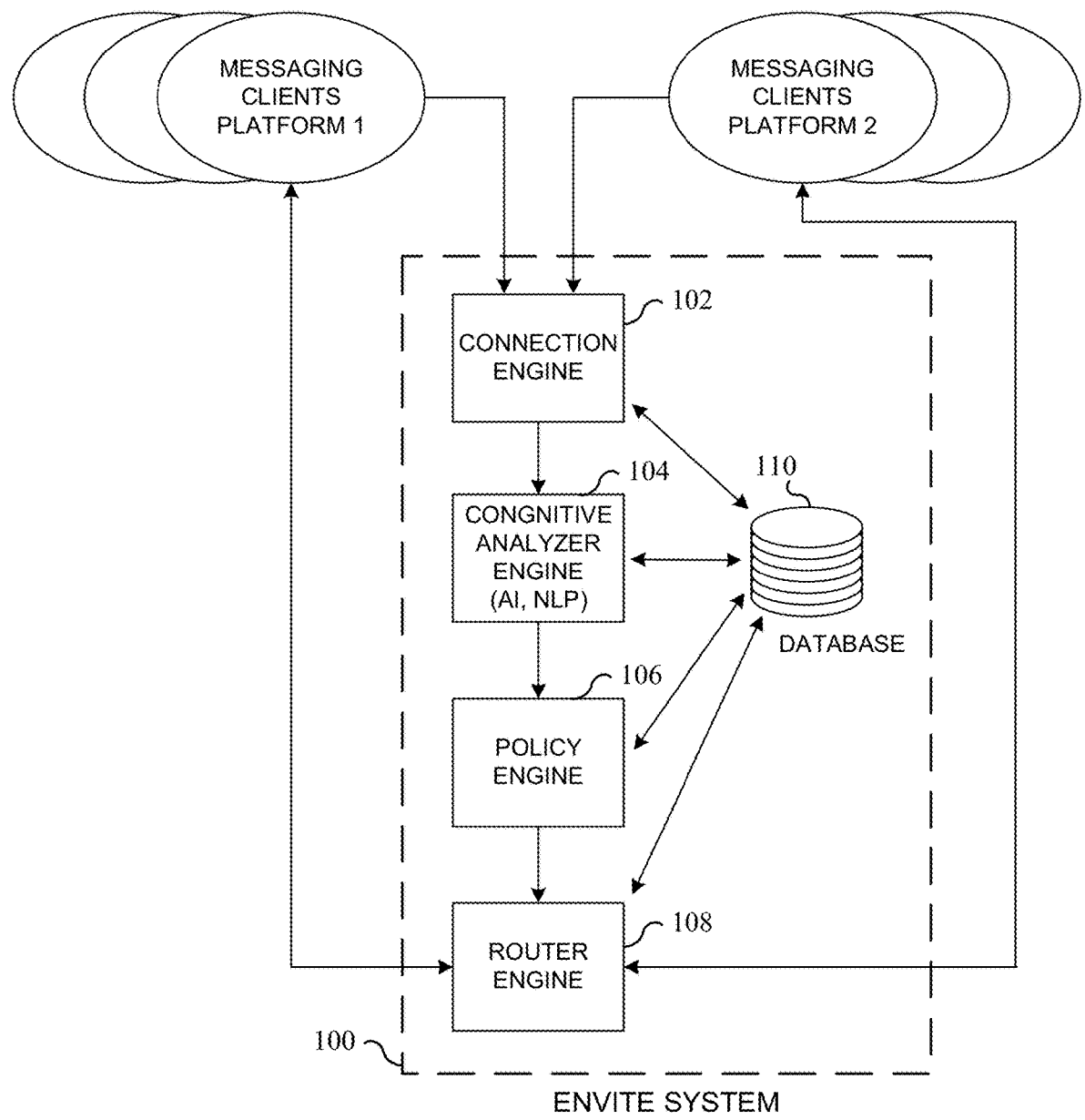
FIG. 1 shows an exemplary embodiment of an Envite system.

FIG. 1 shows an exemplary embodiment of an Envite system 100. The Envite system 100 comprises connection engine 102, cognitive analyzer engine 104, policy engine 106, routing engine 108, and database 110. In various exemplary embodiments, each of the engines of the Envite system 100 comprises any number, combination, selection or order selected from a set of components comprising a processor, CPU, state machine, programmable array, firmware, volatile or non-volatile memory, registers, logic, discrete components, and/or other suitable hardware.

In an exemplary embodiment, the connection engine 102 analyzes user requests and makes decisions regarding how users are to be connected. For example, the connection engine 102 operates to send invites to users through email, if the users are not registered with Envite system. In another embodiment, the connection engine 102 invite users through an Envite application running on the users' preferred platforms. Once an invite is accepted, the connection engine 102 creates channels/rooms on both users' platforms and maintains the connection. One of the primary tasks of the connection engine 102 is to deliver messages from one platform to another to facilitate message exchanges. In addition, connection engine 102 is also responsible for setting up groups and handling additional features that may be subscribed to by Envite users.

In an exemplary embodiment, the cognitive analyzer engine 104 allows users to invoke Envite features in their Envite channel, such as adding new connections or looking for services. The cognitive analyzer engine 104 parses messages using a combination of conversation service, Artificial Intelligence (AI), and Natural Language Processing (NLP) technology. Once messages are interpreted, they are converted to consumable operations using proprietary algorithms to facilitate the features.

In an exemplary embodiment, the policy engine 106 allows Envite users, enterprise administrators, etc. to set, update, and delete policies for message and notification forwarding. The Envite application applies these policies on parsed messages to make decisions about which room/user to forward message contents. In an exemplary embodiment, the policies are integrated with schedulers, calendars, time of day, priority and user relationships (boss-employee or family member) etc., to make intelligent decisions.

In an exemplary embodiment, the router engine 108 routes messages to target clients. The Envite system maintains connections and routes created for a user, or between users, and routes messages based on the message or policies that are applied in the cognitive analyzer engine 104 and policy engine 106. In an exemplary embodiment, a routing algorithm is provided with a multi-threaded asynchronous design to work with nuances of different service provider API behaviors. The router engine 108 is also responsible for maintaining secured access of messages for users, keeping the data private as authorized by the user.

Thus, using the Envite system, messaging clients on platform1 and find, invite and establish connections with messaging clients on platform 2.

Figure 2:
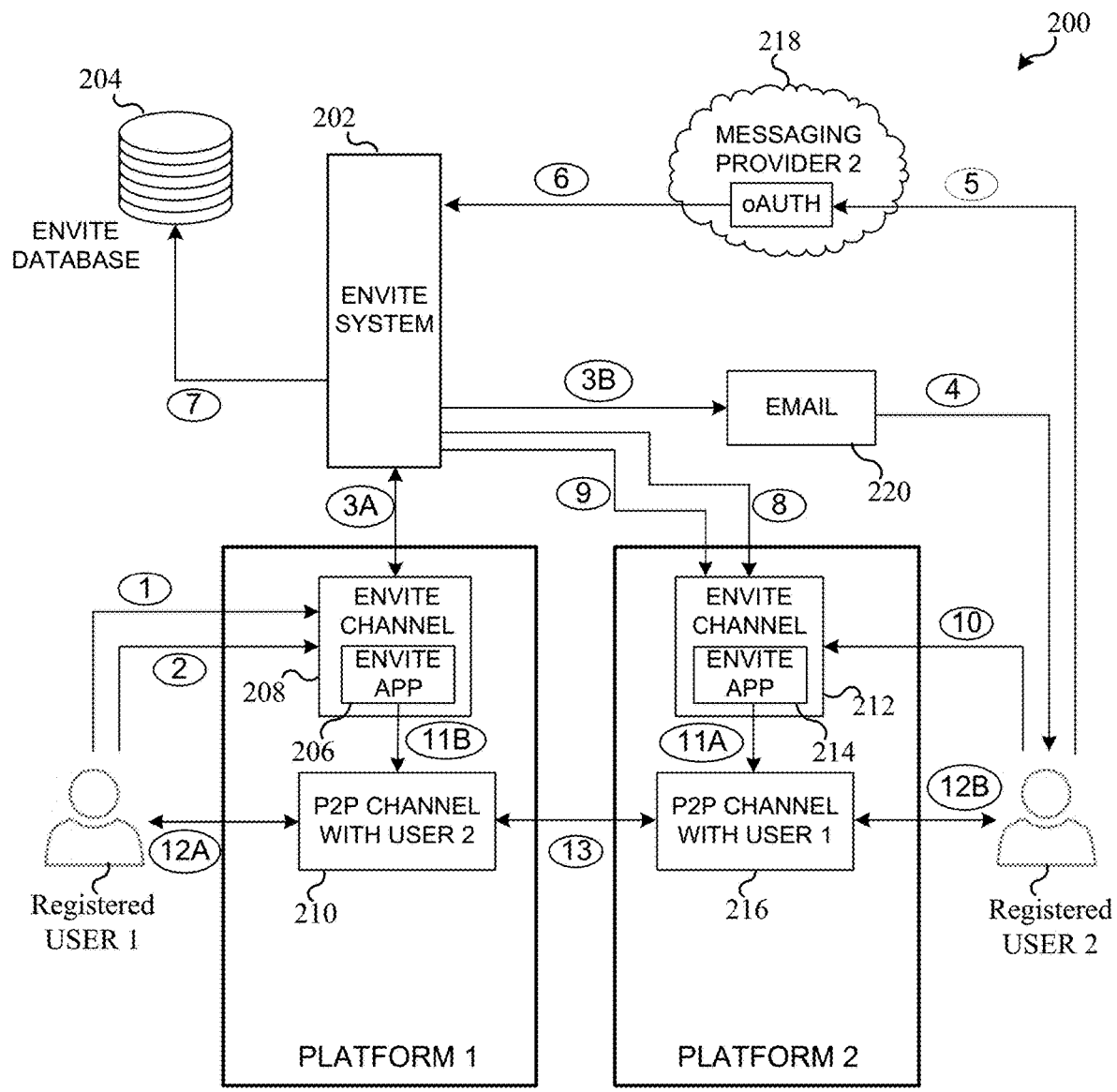
FIG. 2 shows a communication system that includes an exemplary embodiment of an Envite system.

FIG. 2 shows a communication system 200 that includes an exemplary embodiment of an Envite system 202. In the communication system 200, USER1 is registered with Platform 1 to send and receive messages with other users that are registered with Platform 1. USER 1 is also registered with the Envite system 202. When USER 1 registered with the Envite system 202, an Envite channel 208 and Envite application 206 are established on Platform 1.

USER 2 is registered with Platform 2 to send and receive messages with other users that are registered with Platform 2. Thus, users registered with Platform 1 are not able to send and receive messages with users registered on Platform 2.

In various exemplary embodiments, the Envite system 202 operates to allow communication between USER1 and USER2. The following is a sequence of operations that include operations performed by the Envite system 202 to enable communications between USER 1 and USER 2.

During operation 1, USER 1 opens Platform 1 and clicks on the Envite channel 208.

During operation 2, USER 1 makes a request to the Envite channel 208 to message USER 2 by providing an email address of USER 2.

During operation 3A, the Envite system 202 receives the request from USER 1 to message USER 2. Since USER 2 is not registered with the Envite system, the email address of USER 2 is processed by the Envite system.

During operation 3B, the Envite system sends an email invitation to the email account 220 of USER 2, since USER 2 is not registered with the Envite system 202.

During operation 4, USER 2 receives the email invitation and clicks on a link in the email invitation to add an "Envite application" to Platform 2.

During operation 5, USER 2 completes an authorization/authentication process with the messaging provider 218 of USER 2.

During operation 6, the Envite system 202 receives USER 2 permission (via oAuth) to add the "Envite application" to Platform 2.

During operation 7, the Envite system database 204 is updated with USER 2 information.

During operation 8, the Envite system 202 creates an Envite channel 212 and Envite application 214 on Platform 2 for USER 2.

During operation 9, the Envite system 202 posts a message connection request from USER 1 to USER 2.

During operation 10, USER 2 accepts the connection request with USER 1.

During operation 11A, the Envite application 214 create new peer-to-peer (P2P) channel 216 for use in communicating with USER 1.

During operation 11B, the Envite application 206 creates a new P2P channel 210 for use in communicating with USER 2.

During operations 12A and 12B, USER1 and USER2 send and receive messages using the P2P channels.

During operation 13, message routing and delivery between USER 1 and USER 2 is performed by the P2P channels.

As illustrated above, the Envite system 202 operates to setup communications between two users on different platforms.

Figure 3:
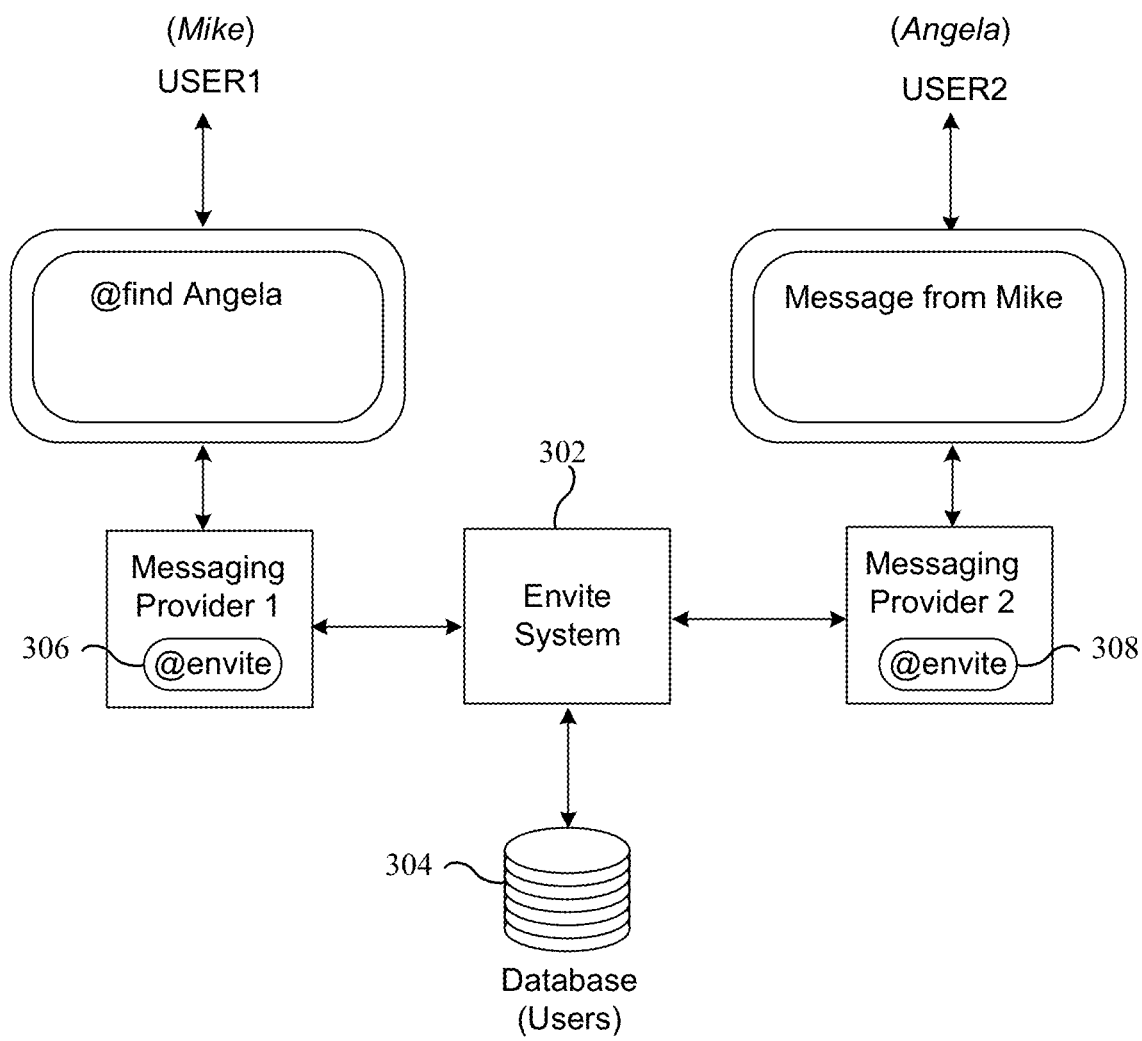
FIG. 3 shows an exemplary embodiment illustrating how the Envite system operates to provide basic messaging between users.

FIG. 3 shows an exemplary embodiment illustrating how the Envite system operates to provide basic messaging between users. In an exemplary embodiment, USER 1 "Mike" is registered with messaging provider 1 and USER 2 "Angela" is registered with messaging provider 2. Both Mike and Angela are registered with Envite system 302 and as a result, Envite applications 306, 308 are installed on their respective messaging providers.

USER 1 "Mike" sends a request to the Envite application 306 to find User2 "Angela". The Envite system 302 receives the request and employs a combination of cognitive, machine learning and Artificial intelligence analysis to search its database 304 and find a user that matches Mike's request. If the request matches multiple users, Mike is offered to choose one user from the results or to refine the query.

Once the user is identified, the Envite system 302 communicates with Envite application 308 to notify Angela of Mike's request to communicate. Angela either accepts or rejects the invitation to communicate. If accepted, the Envite system enables Mike and Angela to communicate with each other.

Figure 4:
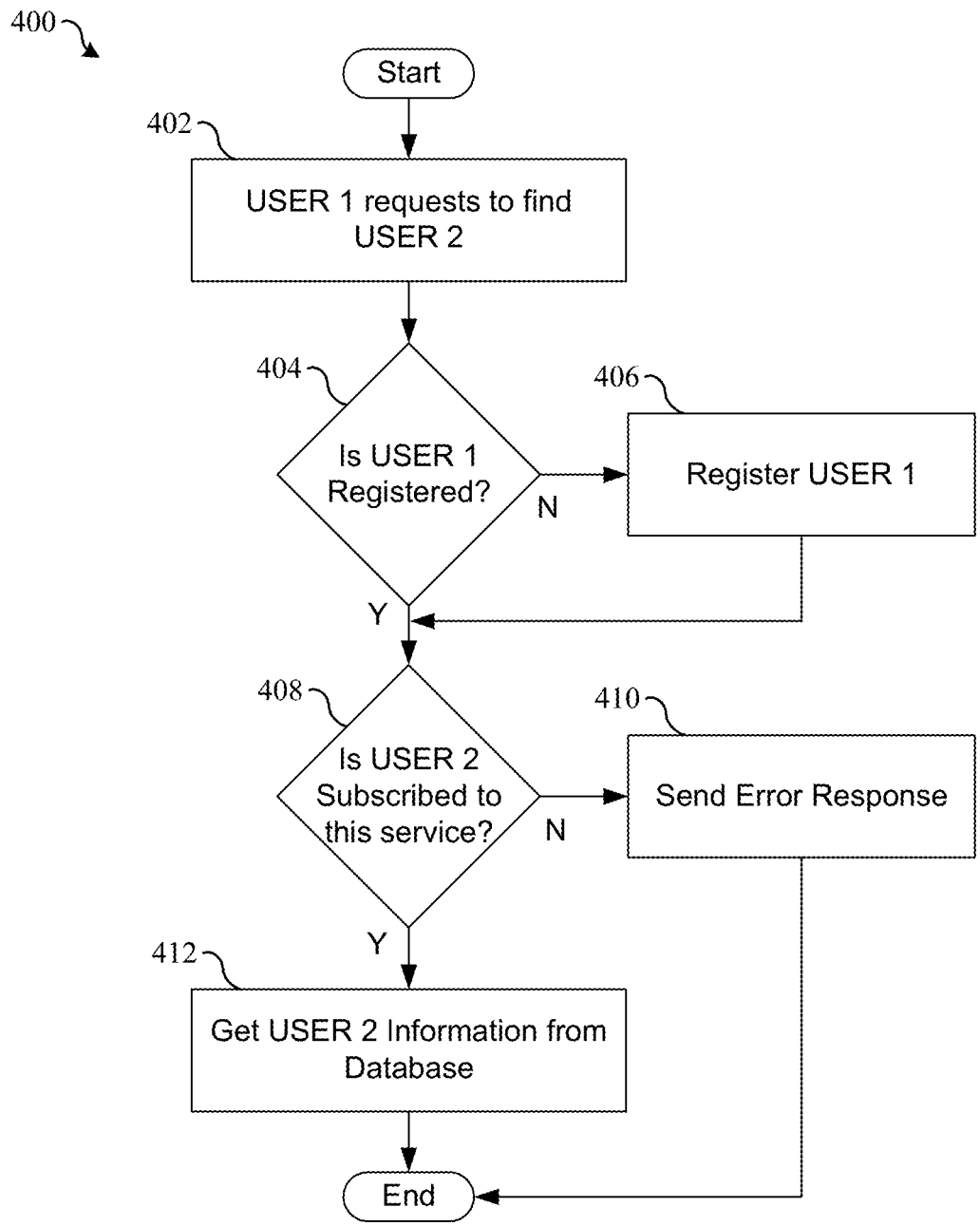
FIG. 4 shows an exemplary embodiment of a method performed by the Envite system to find a user.

FIG. 4 shows an exemplary embodiment of a method 400 performed by the Envite system to find a user. In an exemplary embodiment, the method 400 is performed by the Envite system 100 shown in FIG. 1.

At block 402, USER 1 wants to search for another user (USER 2) who doesn't exist with the same service provider. The request is handled by the Envite system. For example, USER 1 submits the request to the connection engine 102.

At block 404, the Envite system checks the subscription status of USER 1 in its database. If USER 1 is not registered, the method proceeds to block 406. If USER 1 is registered, the method proceeds to block 408. For example, the connection engine 102 passes the request to the cognitive analyzer 104 that analyzes the request and searches the database 110.

At block 406, USER 1 is provided an opportunity to register with the Envite system. After registering, the method proceeds to block 408. For example, the connection engine 102 interacts with USER 1 to complete the registration process.

At block 408, the Envite system checks the subscription status of USER 2 in its database. If USER 2 is not subscribed, the method proceeds to block 410. If USER 2 is subscribed, the method proceeds to block 412. For example, the cognitive analyzer 104 performs this function.

At block 410, an error response is sent to USER 1 since USER 2 is not subscribed to the Envite system. For example, the connection engine 102 performs this function.

At block 412, the Envite system obtains USER 2 information from its database. If USER 2 is in the subscription list and configured to be discovered per its subscription policy, USER 2 will be prompted of interest from USER 1. If USER 2 accepts the request, then connectivity between users (USER 1 and USER 2) is established as per the messaging flow illustrated above. For example, the cognitive analyzer 104 searches the database 110 and the connection engine 102 communicates with USER 2.

Figure 5:
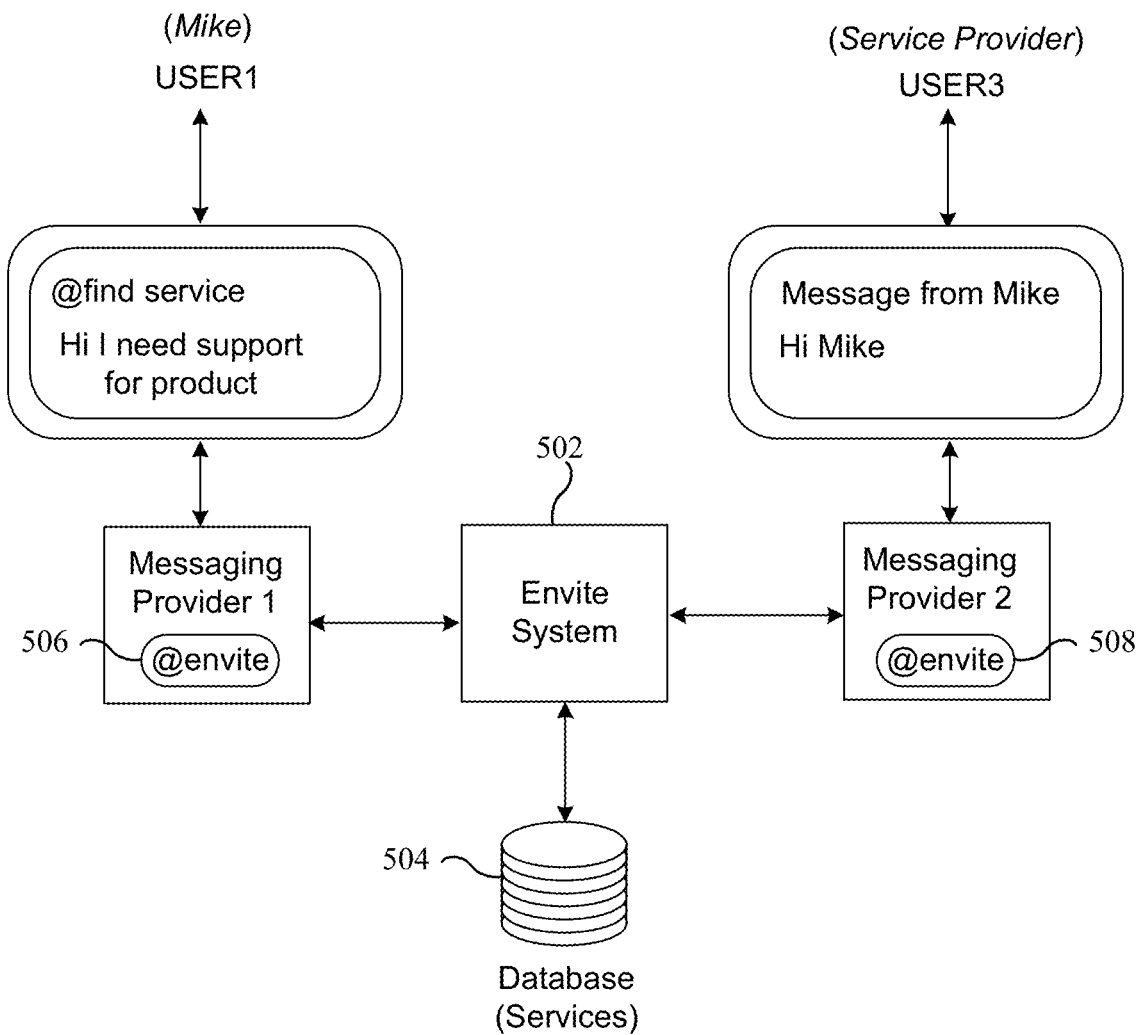
FIG. 5 shows an exemplary embodiment illustrating how the Envite system operates to provide service requests.

FIG. 5 shows an exemplary embodiment illustrating how the Envite system 502 operates to provide service requests. In an exemplary embodiment, USER 1 "Mike" is registered with messaging provider 1 and USER 3 "Service Provider" is registered with messaging provider 2. Both Mike and Service Provider are registered with Envite system 502 and as a result, Envite applications 506, 508 are installed on their respective messaging providers.

USER 1 "Mike" sends a request to the Envite application 506 to find a desired service. The Envite system 502 receives the request and employs a combination of cognitive, machine learning, and Artificial Intelligence analysis to search its database 504 to find a service that matches Mike's request. If the request matches multiple services, Mike shall be offered to choose one service from the results or to refine the query.

Once the service is identified, the Envite system 502 communicates with Envite application 508 to notify the service provider of Mike's request to communicate. The service provider either accepts or rejects the invitation to communicate. If accepted, the Envite system enables Mike and the service provider to communicate with each other. If the service provider denies the request, feedback is sent back to Mike and a new service provider is chosen.

Figure 6:
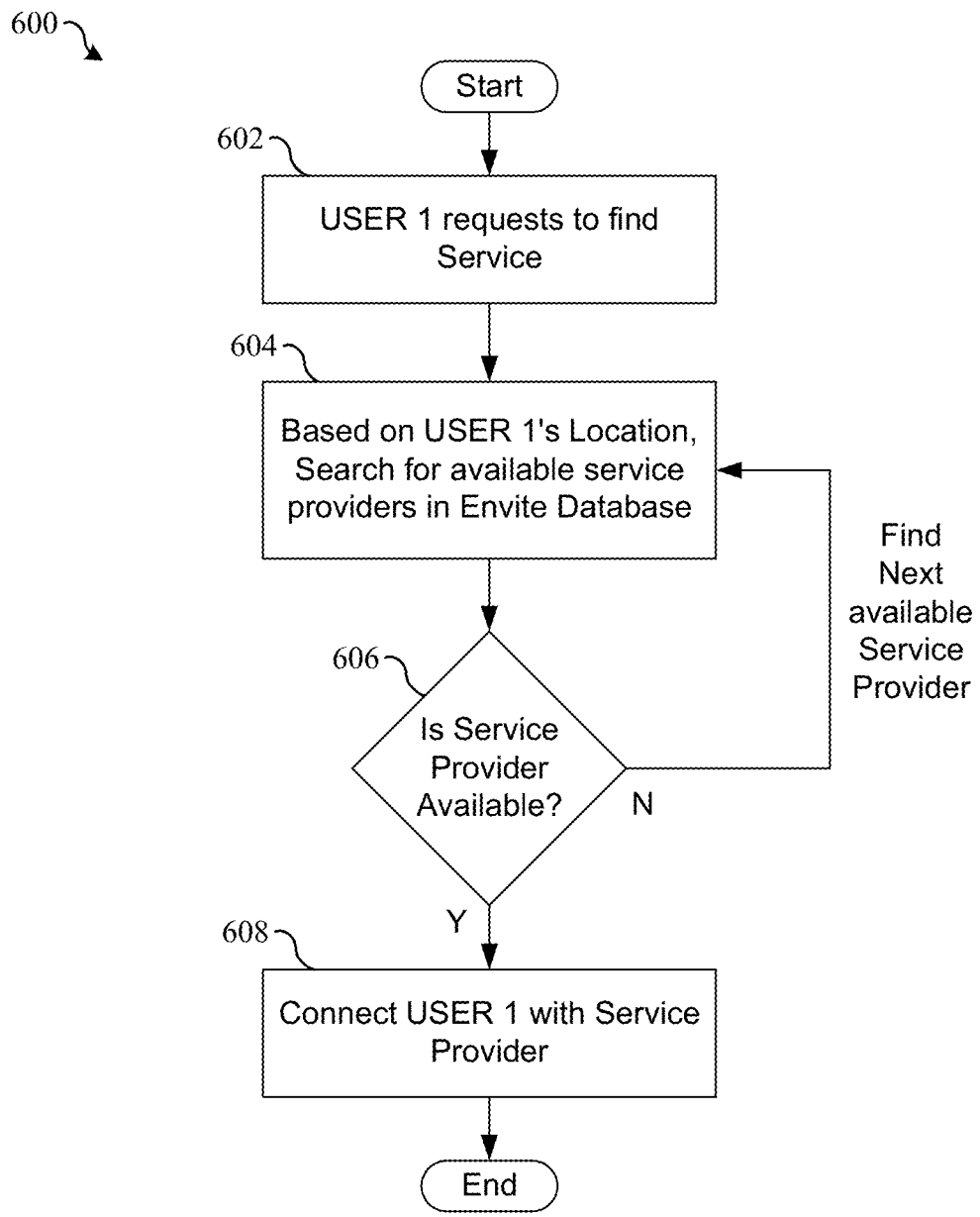
FIG. 6 shows an exemplary embodiment of a method performed by the Envite system to provide service requests.

FIG. 6 shows an exemplary embodiment of a method 600 performed by the Envite system to provide service requests. In an exemplary embodiment, the method 600 is performed by the Envite system 100 shown in FIG. 1. In an exemplary embodiment, USER 1 is subscribed to the Envite system and is allowed to search for registered services.

At block 602, USER 1 requests a service like "plumbing help" in a message to the Envite system. In an exemplary embodiment, USER 1 makes this request to the connection engine 102.

At block 604, the Envite system looks for relevant service providers and selects one of them using an Artificial Intelligence (AI) algorithm. In an exemplary embodiment, cognitive analyzer 104 searches the database 110 to perform this function.

At block 606, the service provider is contacted to check if they want to provide the service. If so, the method proceeds to block 608. If not, the method proceeds to block 604 where another service provider is selected. In an exemplary embodiment, connection engine 102 performs this function.

At block 608, the service provider accepts the request and USER 1 is connected with the service provider as per the messaging flow outlined above. In an exemplary embodiment, connection engine 102 and the routing engine 108 perform this function.

Figure 7:
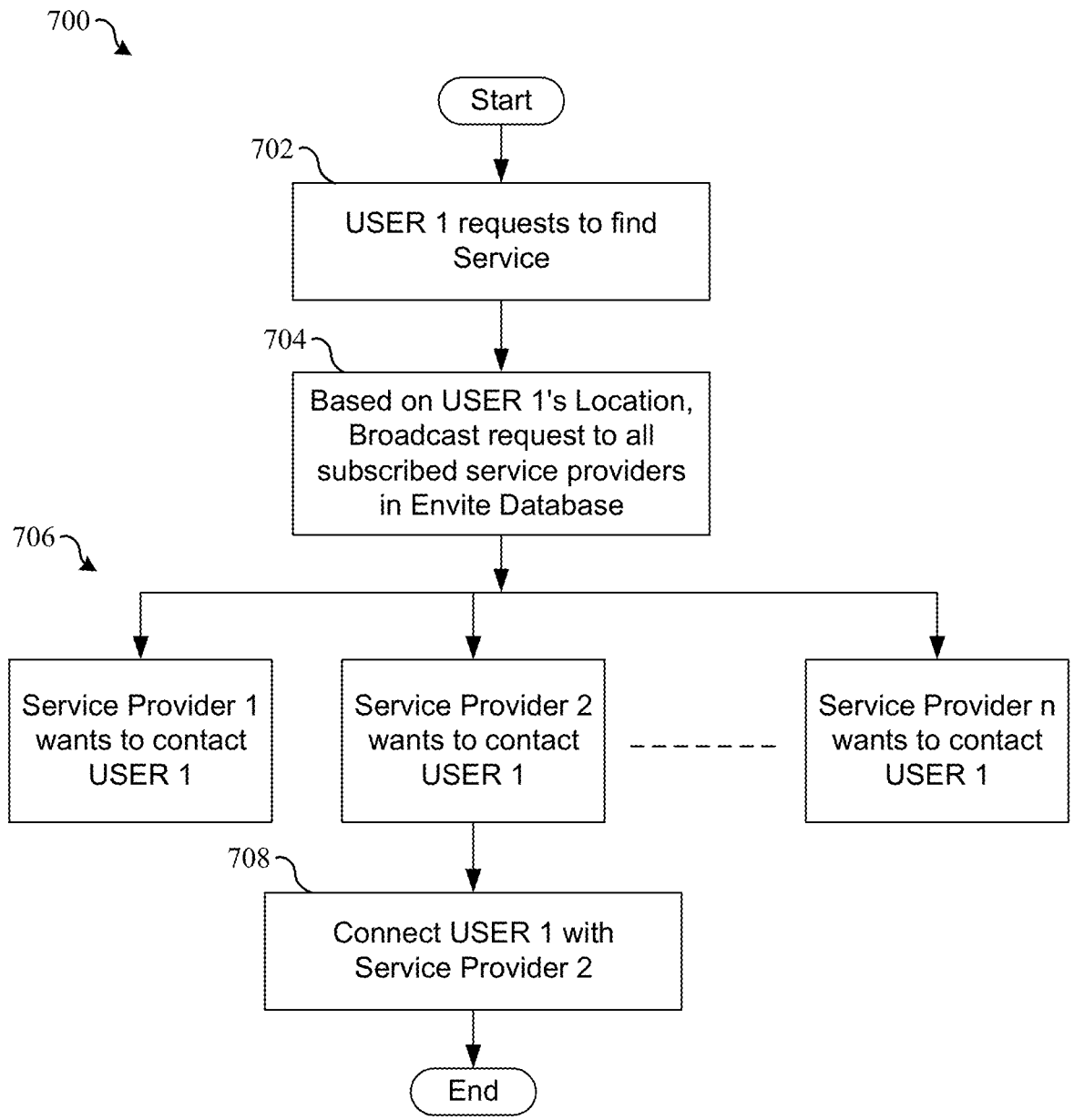
FIG. 7 shows an exemplary embodiment of a method performed by the Envite system to broadcast service requests.

FIG. 7 shows an exemplary embodiment of a method 700 performed by the Envite system to broadcast service requests. In an exemplary embodiment, the method 700 is performed by the Envite system 100 shown in FIG. 1. Instead of searching for services and contacting service providers in a certain order, the request is broadcasted to all the relevant service providers.

At block 702, USER 1 requests to find a service. The request is received by the Envite system. In an exemplary embodiment, the request is received by the connection engine 102.

At block 704, based on the location of USER 1, the Envite system broadcast the request to all subscribed service providers in the Envite database relative to the location of USER 1. In an exemplary embodiment, the cognitive analyzer 104 determines the appropriate service provides from the database 110 and the connection engine 102 broadcasts the request to the service providers.

At blocks 706, one or more service providers receive the broadcast.

At block 708, the first service provider that responds will be connected with USER 1, and then the USER1 has the choice to accept or reject the services. Users can continue using their existing messaging client. After they are added to the Envite system, users from different providers may easily enable the cross-client user federation and relevant messaging or communications features for enhanced user productivity. Additionally, service providers can use this new platform to offer their custom services to attract users from any provider. Likewise, users can opt to leverage cross-platform services available from different providers. In an exemplary embodiment, service providers communicate with the connection engine 102 to perform this function.

Figure 8:
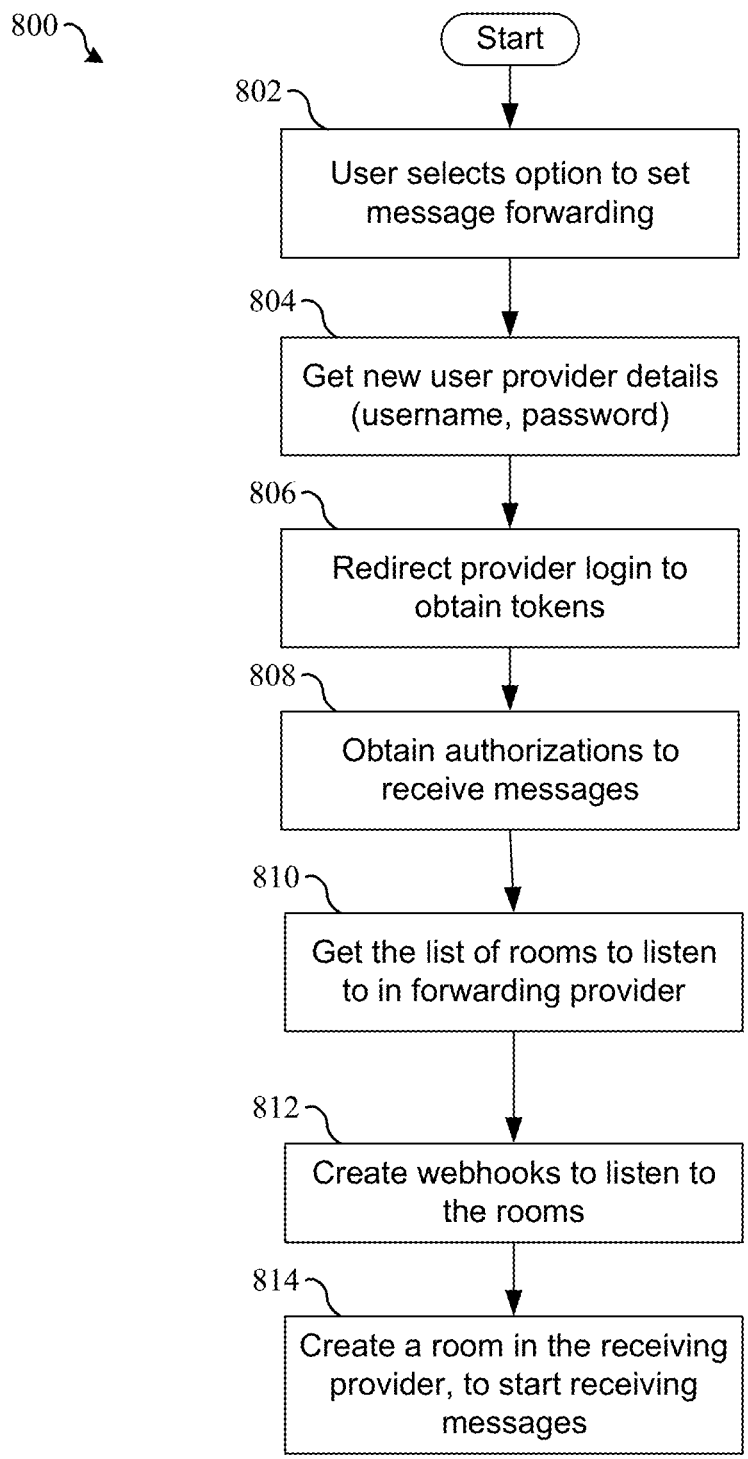
FIG. 8 shows an exemplary embodiment of a method performed by the Envite system to set up message forwarding.

FIG. 8 shows an exemplary embodiment of a method 800 performed by the Envite system to set up message forwarding. In an exemplary embodiment, the method 800 is performed by the Envite system 100 shown in FIG. 1. For example, a user registered with the Envite system interacts with the connection engine 102 and the policy engine 106 to update the database 110 to setup message forwarding.

At block 802, a user selects an option to set message forwarding thereby enabling a single number reach configuration.

At block 804, new user detailed are obtained. For example, the new details include username and password.

At block 806, provider login is redirected to obtain tokes.

At block 808, authorizations are obtained to receive messages.

At block 810, a list of rooms to listen to in forwarding provider is obtained. For example, a room is equivalent to a channel and corresponds to conversation with two or more people.

At block 812, webhooks are created to listen in the rooms. For example, webhooks are APIs provided by service provider.

At block 814, a room is created in the receiving provider to start receiving messages.

Figure 9:
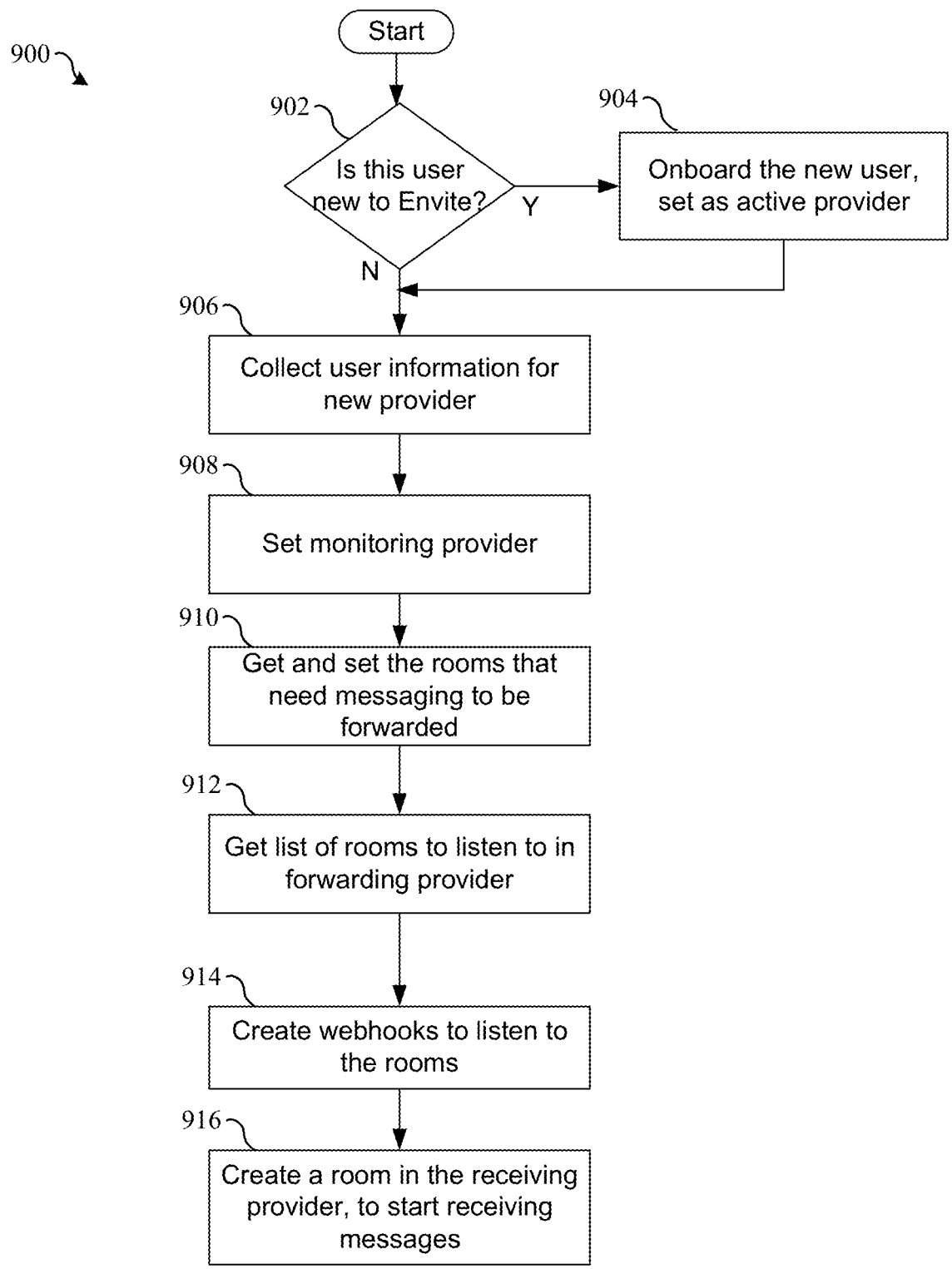
FIG. 9 shows an exemplary embodiment of a method performed by the Envite system to provide message forwarding.

FIG. 9 shows an exemplary embodiment of a method 900 performed by the Envite system to provide message forwarding. In an exemplary embodiment, the method 900 is performed by the Envite system 100 shown in FIG. 1.

At block 902, a determination is made as to whether a user is new to the Envite system. If so, the method proceeds to block 904. If not, the method proceeds to block 906. For example, the cognitive analyzer 104 checks the database 110 to determine if the user is new to the Envite system.

At block 904, the new user is added to the Envite system and set as an active provider. For example, the cognitive analyzer 104 updates the database 110 to add the user to the Envite system.

At block 906, user information is collected from the new user and stored in the Envite database. For example, the cognitive analyzer 104 updates the database 110 with user information.

At block 908, a monitoring provider is established. For example, the cognitive analyzer 104 and the policy engine 106 operate to perform this function.

At block 910, rooms that need messaging to be forwarded are determined. For example, the cognitive analyzer 104 and the policy engine 106 operate to perform this function.

At block 912, a list of rooms to listen to in the forwarding provider are obtained. For example, the cognitive analyzer 104 and the policy engine 106 operate to perform this function.

At block 914, webhooks are created to listen to the rooms. For example, the cognitive analyzer 104 and the policy engine 106 operate to perform this function.

At block 916, a room in the receiving provided is created to receive forwarded messages. For example, the router engine 108 performs this function.

Figure 10:
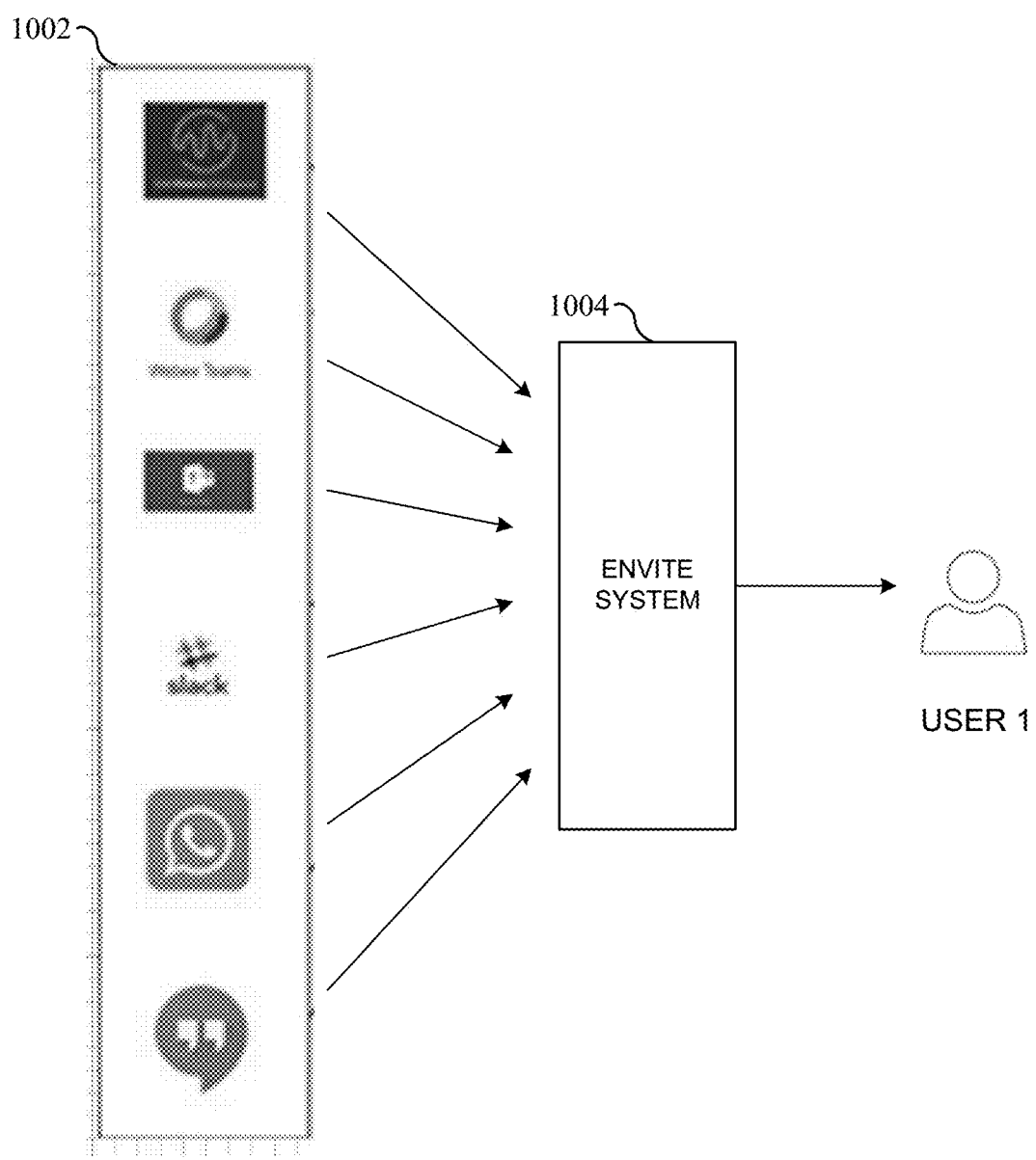
FIG. 10 shows an exemplary embodiment illustrating how the Envite system provides intelligent messages and notifications forwarding.

FIG. 10 shows an exemplary embodiment illustrating how the Envite system provides intelligent messages and notifications forwarding.

In an exemplary embodiment, USER 1 is using multiple clients 1002. USER 1 may desire to use Webex Teams during business hours and WhatsApp after business hours. With the Envite system 1004, USER 1 can intelligently route the messages across multiple clients based on one or more of the following parameters.

1. Time of Day
2. Escalation policy
3. Enterprise policy
4. Location-based
5. Context of the message In an exemplary embodiment, the policy settings are set and controlled by enterprise as well as the users. User can have peace of mind getting the just needed information and be in contact always using their favorite client. In addition, the same intelligent forwarding is available between connections. For example, an enterprise may configure to forward messages to multiple users, or escalate in a certain order or policy.

Figure 11:
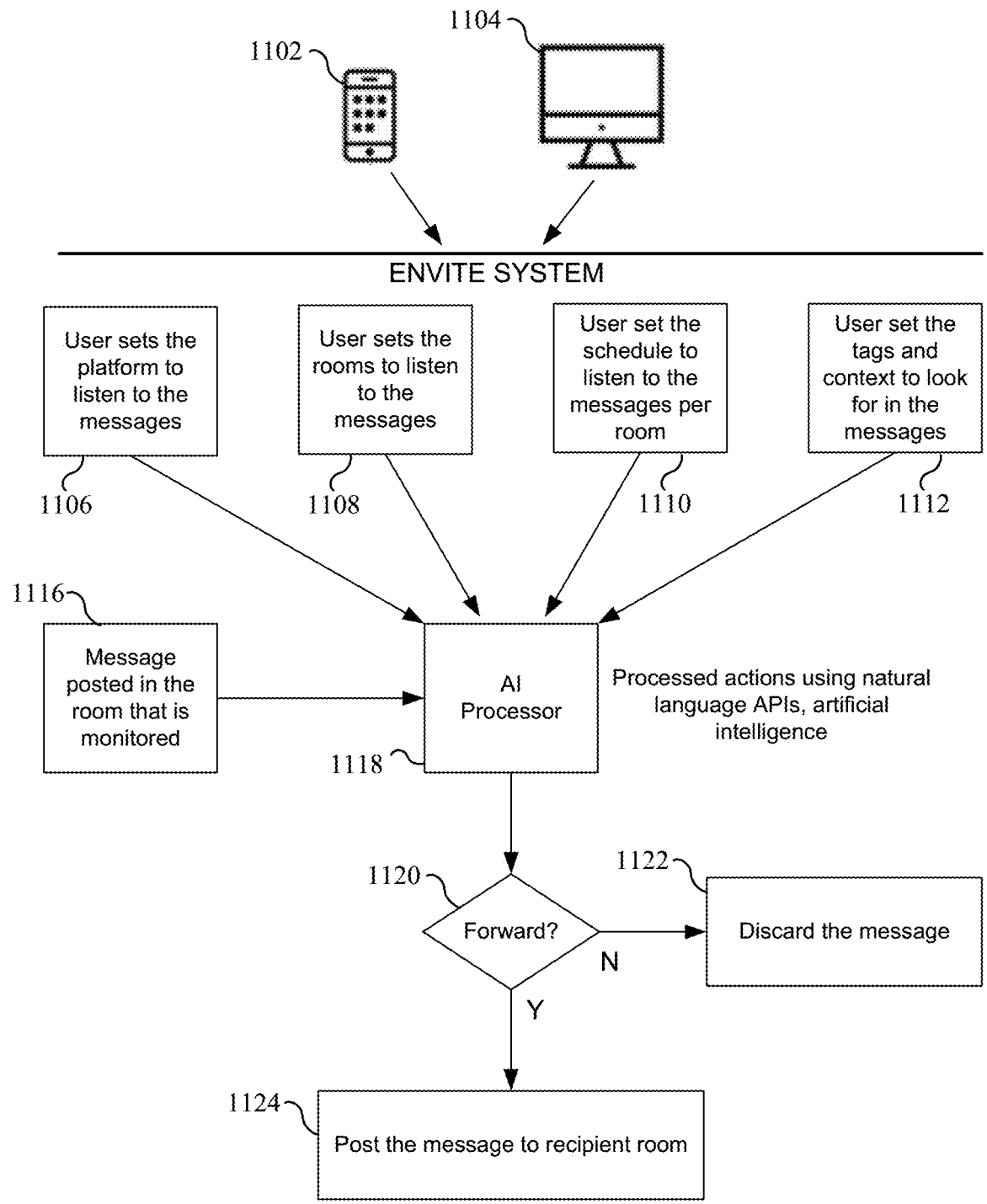
FIG. 11 shows an exemplary embodiment illustrating how the Envite system provides message forwarding.

FIG. 11 shows an exemplary embodiment illustrating how the Envite system provides message forwarding. For example, a USER interacts with the Envite system using a mobile device 1102 or a desktop computer 1104. The USER sets up various parameters with the Envite system for message forwarding. For example, the USER sets the platform 1106, rooms 1108, schedule 1110, and tags and context 1112 associated with messages to be forwarded. After the USER sets up the forwarding parameters, a message 1116 is posted to a room that is being monitored. The AI processor 1118 provides (1) natural language classifier API and (2) conversation service the processes messages received in a monitored room. A determination is made at block 1120 as to whether a message received is to be forwarded to a recipient room. If not, the message is discarded 1122. If the message meets the established criteria the message is forwarded 1124 by posting the message to the receipt room.

Figure 12:
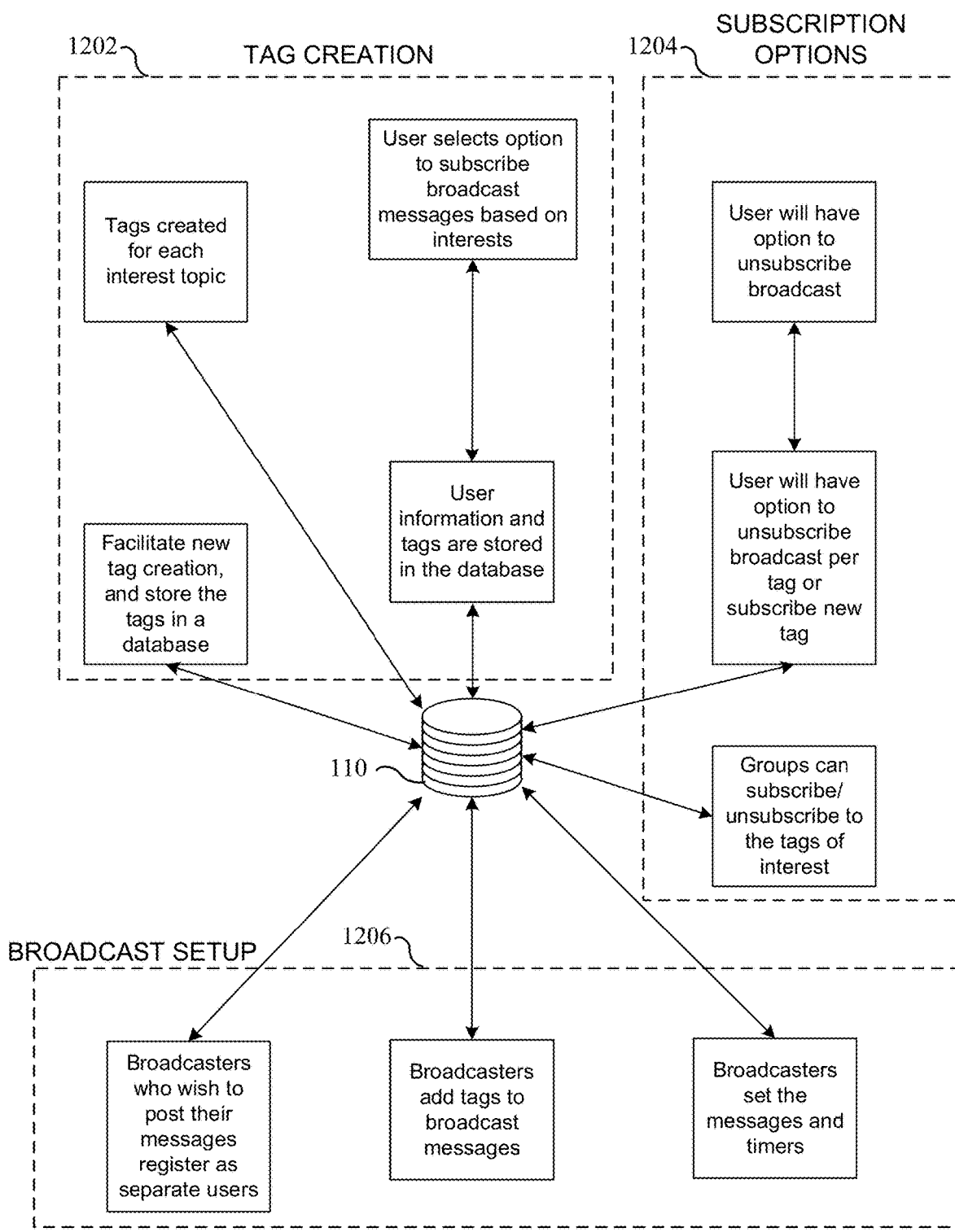
FIG. 12 shows an exemplary embodiment of operations performed by the Envite system to set up message broadcasting.

FIG. 12 shows an exemplary embodiment of operations performed by the Envite system to set up message broadcasting. In an exemplary embodiment, the operations are performed by the Envite system 100 shown in FIG. 1. For example, a user registered with the Envite system interacts with the policy engine 106 to setup message broadcasting.

At block 1202, tag creation is performed.

At block 1204, subscription options are selected.

At block 1206, broadcast setup is performed.

Figure 13:
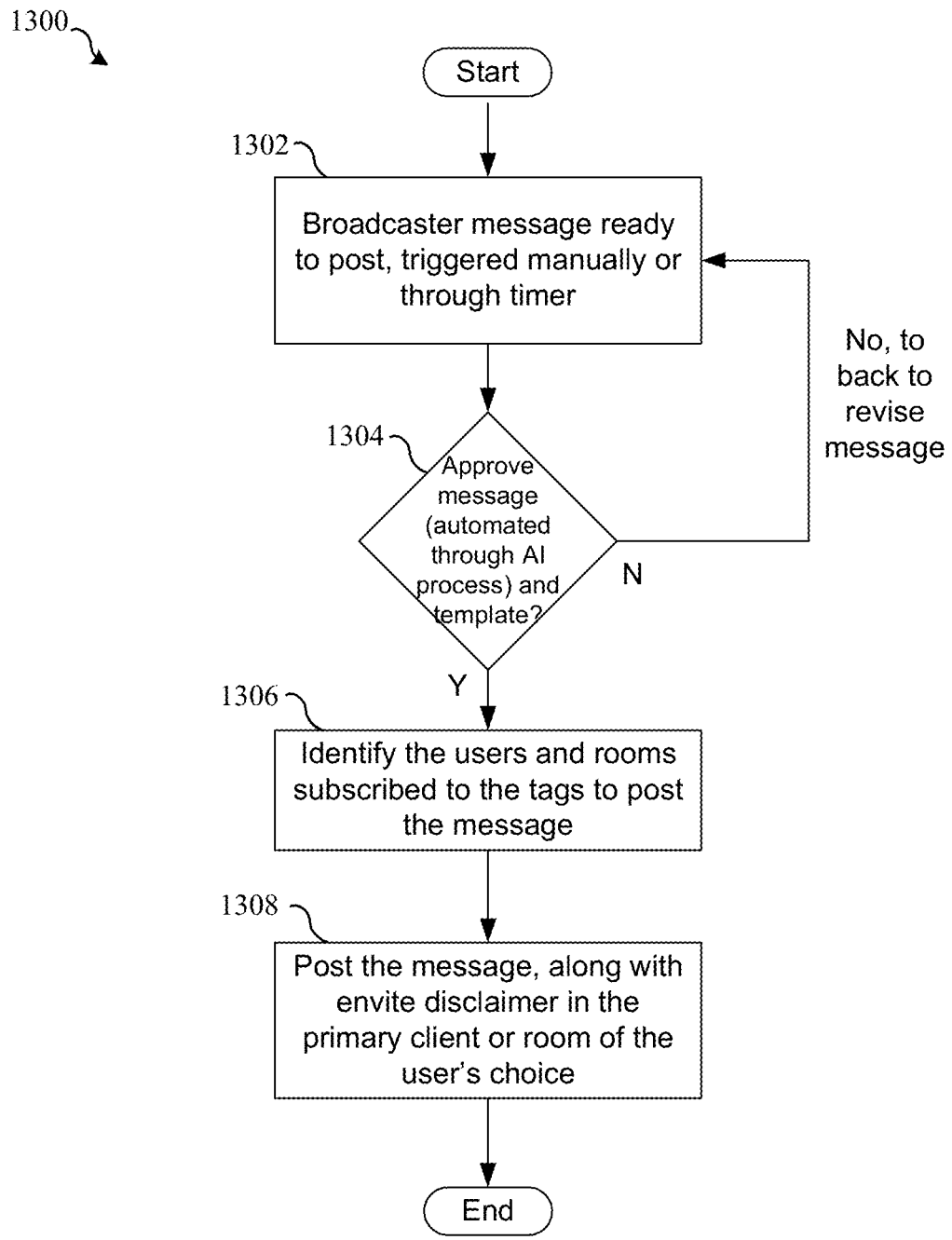
FIG. 13 shows an exemplary embodiment of a method performed by the Envite system to perform message broadcasting.

FIG. 13 shows an exemplary embodiment of a method 1300 performed by the Envite system to perform message broadcasting. In an exemplary embodiment, the method 1300 is performed by the Envite system 100 shown in FIG. 1. In an exemplary embodiment, the cognitive analyzer 104 and the router engine 108 perform the functions described below.

At block 1302, a broadcaster message is ready to post and is triggered manually or through a timer.

At block 1304, a determination is made as to whether the message is approved. In an embodiment, the message approval is automated and performed using an AI process. If the message is not approved, the method returns to block 1302 to revise the message. If the message is approved, the method proceeds to block 1306.

At block 1306, users and rooms subscribed to the tags to post the message are identified.

At block 1308, the message is posted along with Envite disclaimer in the primary client or room of the user's choice.

Figure 14:
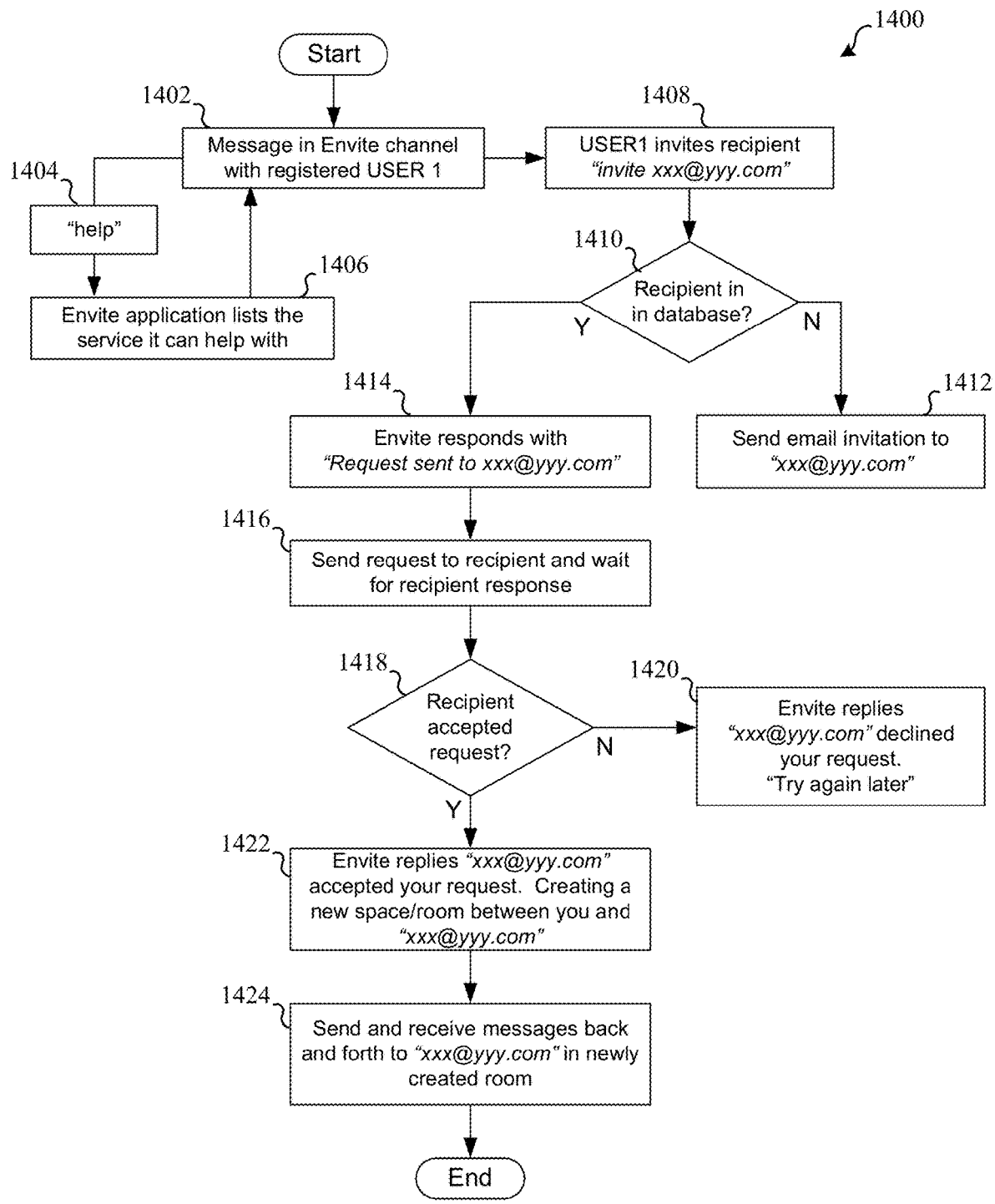
FIG. 14 shows an exemplary embodiment of a method for operating the Envite system to provide message flow between users.

FIG. 14 shows an exemplary embodiment of a method 1400 for operating the Envite system to provide message flow between users. In an exemplary embodiment, the method 1400 is performed by the Envite system 100 shown in FIG. 1. For example, the connection engine 102 communicates with users, the cognitive engine 104 coordinates user information in the database 110, and the router engine 108 routes messages to perform the operations described below.

At block 1402, USER 1 is registered with Envite system to message with others.

At block 1404, the Envite system provides various "help" to USER 1, which includes help with connecting with non-registered users.

At block 1406, the Envite system lists the services it provides as part of the help function.

At block 1408, USER1 invites a recipient to communicate using messages. The recipient is identified by an email address.

At block 1410, it is determined whether or not recipient is in Envite database. If not, the method proceeds to block 1412. If so, the method proceeds to block 1414.

At block 1412, an email invitation is sent to the recipient at the email address provided.

At block 1414, a request is sent by the Envite system to the recipient since the recipient was found in the Envite database.

At block 1416, after the request is sent, the Envite system waits for a response from the recipient.

At block 1418, a determination is made as to whether or not the recipient responded. If not, the method proceeds to block 1420. If so, the method proceeds to block 1422.

At block 1420, the Envite system communicates to USER 1 that the recipient has declined the request to communicate.

At block 1422, The Envite system communicates to USER 1 that the recipient has accepted the request to communicate and a new room is established for USER 1 and the recipient to communicate.

At block 1424, messages are sent between USER 1 and recipient using the newly established room.

Figure 15:
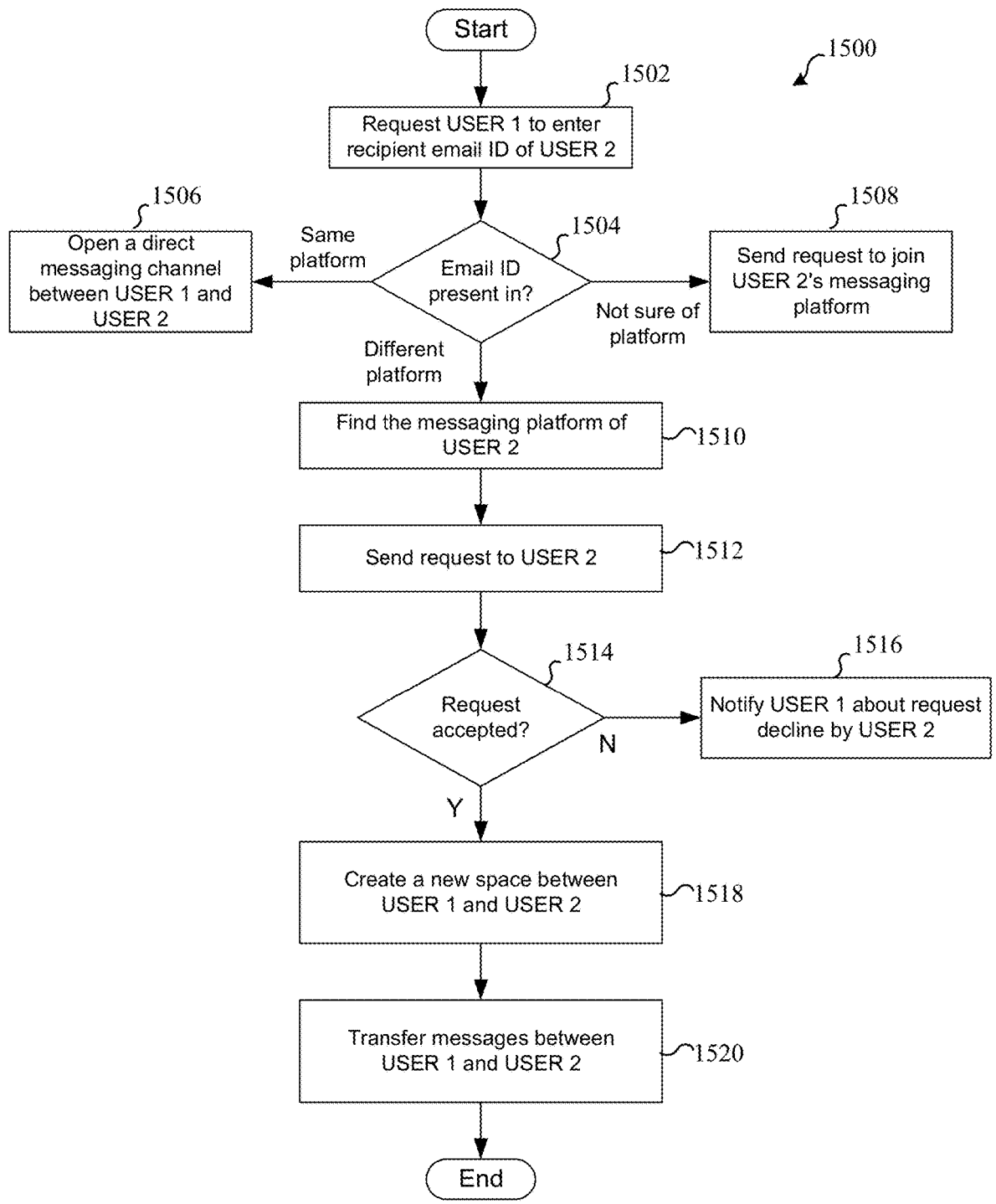
FIG. 15 shows an exemplary embodiment of a method for operating the Envite system to present and accept an invitation to message with a registered Envite user.

FIG. 15 shows an exemplary embodiment of a method 1500 for operating the Envite system to present and accept an invitation to message with a registered Envite user. In an exemplary embodiment, the method 1500 is performed by the Envite system 100 shown in FIG. 1.

At block 1502, USER 1 seeks to communicate with USER 2. USER 1 is requested to enter email account information for USER 2. For example, the connection engine 102 performs this function.

At block 1504, the email account information is processed to determine if USER 2 is registered with the Envite system (same platform), on a different platform, or if the system is unable to determine USER 2's platform. If the email account indicates that USER 2 is registered with the Envite system, the method proceeds to block 1506. If the email account indicates that USER 2 is registered with a different platform, the method proceeds to block 1510. If the email account of USER 2 is unknown, the method proceeds to block 1508. For example, the cognitive analyzer 104 accesses the database 110 to perform this function.

At block 1506, a direct messaging channel is opened between USER 1 and USER 2 since both are registered with the Envite system. For example, the router engine 108 performs this function.

At block 1508, a message is sent to join the messaging platform of USER 2 so that USER 1 may communication with USER 2. For example, the connection engine 102 or router engine 108 performs this function.

At block 1510, a messaging platform indicated by the email account of USER 2 is determined. For example, the cognitive analyzer 104 performs this function.

At block 1512, a message is sent to the recipient to accept messaging with USER 1. For example, the connection engine 102 performs this function.

At block 1514, it is determined if USER 2 accepted the request to message is USER 1. If not, the method proceeds to block 1516. If so, the method proceeds to block 1518. For example, the cognitive analyzer 104 performs this function.

At block 1516, USER 1 is notified about the request being denied by USER 2. For example, the connection engine 102 performs this function.

At block 1518, a new space is created by the Envite system to allow communication between USER 1 and USER 2. For example, the connection engine 102 and/or the router engine 108 performs this function.

At block 1520, messages are transferred between USER 1 and USER 2. For example, the connection engine 102 and/or the router engine 108 performs this function.

Figure 16:
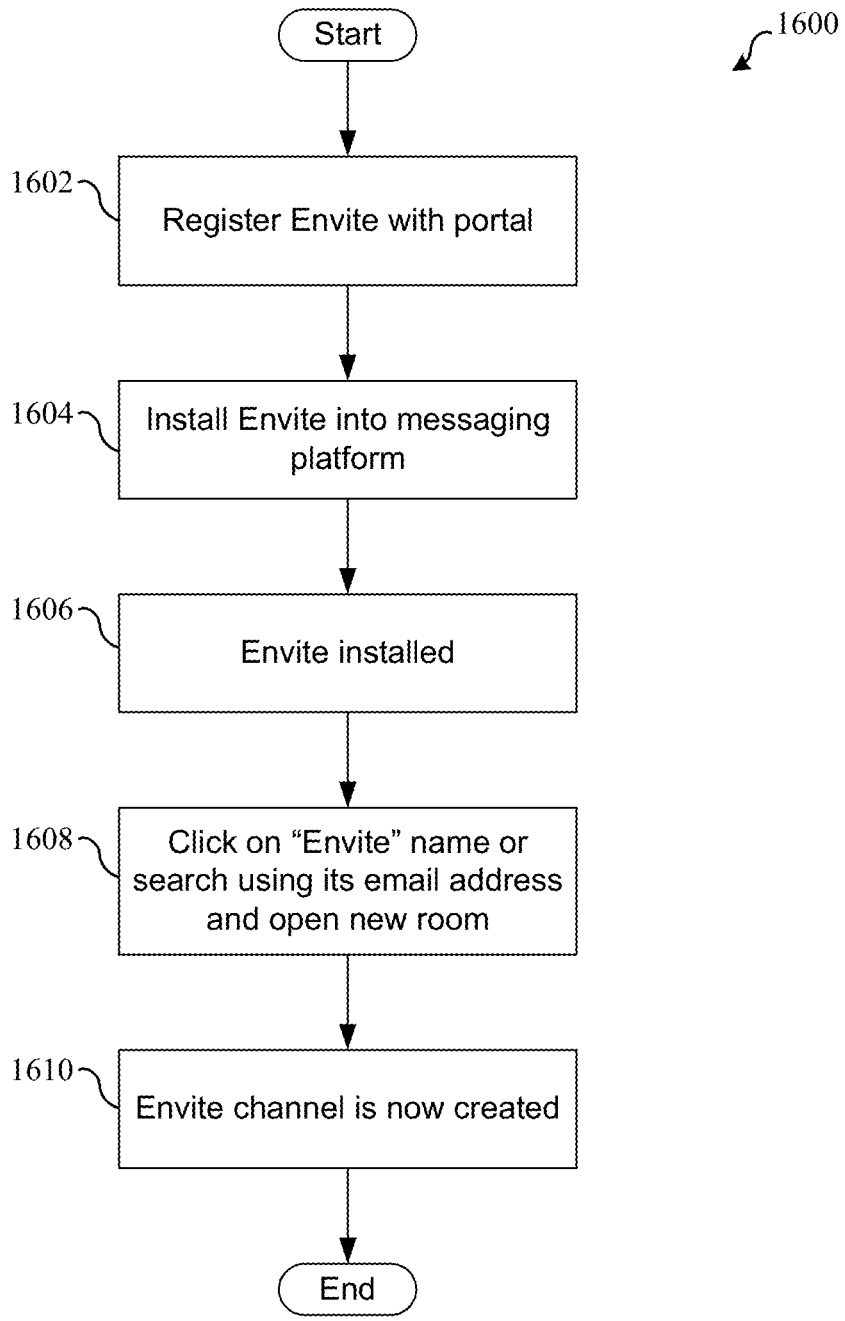
FIG. 16 shows an exemplary embodiment of a method for operating the Envite system to provide a simplified version of user invitation.

FIG. 16 shows an exemplary embodiment of a method for operating the Envite system to provide a simplified version of user invitation. In an exemplary embodiment, the method 1600 is performed by the Envite system 100 shown in FIG. 1.

At block 1602, a USER is registered with the Envite portal. For example, the connection engine 102 communicate with the USER and the cognitive analyzer 104 registers the USER and updates the database 110.

At block 1604, the Envite application is installed into the messaging platform of the USER. For example, the connection engine 102 communicates with the messaging platform of the USER to install the Envite application.

At block 1606, the installation is completed.

At block 1608, the USER clicks on "Envite" icon or enters search using an email address to open a new room for messaging communication. For example, the connection engine 102 communicates with the user and the router engine 108 opens the room with the user.

At block 1610, an Envite channel is now open.

FIGS. 17A-D show detailed exemplary embodiments of the engines of the Envite system 100. For example, the Envite system 100 comprises connection engine 102, cognitive analyzer engine 104, policy engine 106, and routing engine 108. In various exemplary embodiments, each of the engines of the Envite system 100 comprises any number, combination, selection or order selected from a set of components comprising a processor, CPU, state machine, programmable array, firmware, volatile or non-volatile memory, registers, logic, discrete components, and/or other suitable hardware.

Figure 17A:
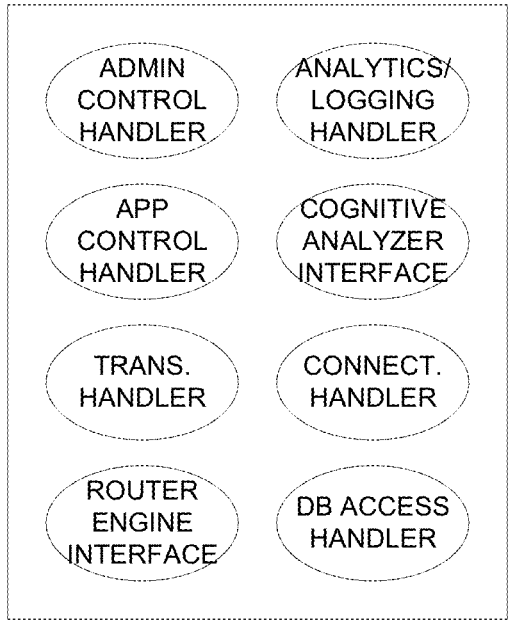
FIGS. 17A-D shows detailed exemplary embodiments of the engines of the Envite system shown in FIG. 1.

FIG. 17A shows a detailed exemplary embodiment of the connection engine 102. In an exemplary embodiment, the connection engine 102 comprises the following components.

1. An application control handler that handles instructions/commands and messages from the Envite application installed on a messaging platform.
2. An administration control handler that handles user actions in the Envite portal dashboard to manage user connections and accounts.
3. A transactions handler that processes new user connection requests.
4. A router engine interface that handles interactions with the router engine component.
5. A cognitive analyzer interface that handles interactions with the cognitive analyzer engine component.
6. A connections handler that manages connections for users.
7. A database (DB) access handler that interfaces with the Envite database for onboarding users/creating connections.
8. An analytics/logging handler that provides analytics and logging for the connections engine module.

Figure 17B:
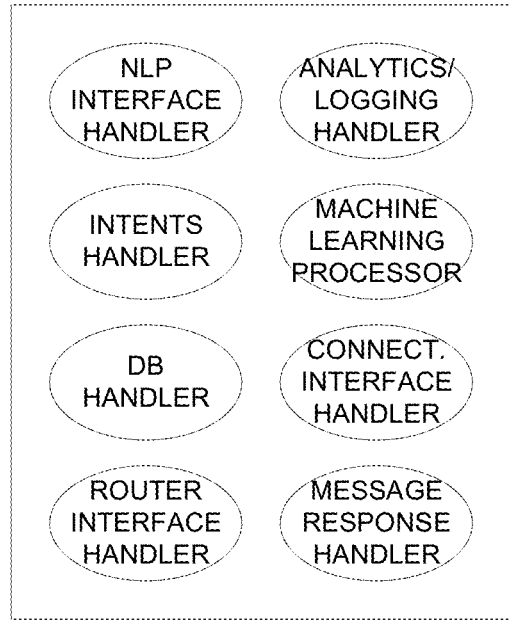

FIG. 17B shows a detailed exemplary embodiment of the cognitive analyzer engine 104. In an exemplary embodiment, the cognitive analyzer engine 104 comprises the following components.

1. An NLP interface handler that handles interface with a third party NLP analyzer by passing messages and responses.
2. Intents handier that maintains and processes message intents (commands).
3. Connections interface handler that interfaces with the connections engine component.
4. Router interface handler that interfaces with router engine component.
5. Message response handler that provides handling and preparing responses to Envite application commands.
6. DB handler that interfaces save/retrieve Envite commands and related information.
7. Machine learning processor that learns user behavior to serve users better.
8. Analytics/logging handler that provides analytics and logging for the cognitive analyzer engine module.

Figure 17C:
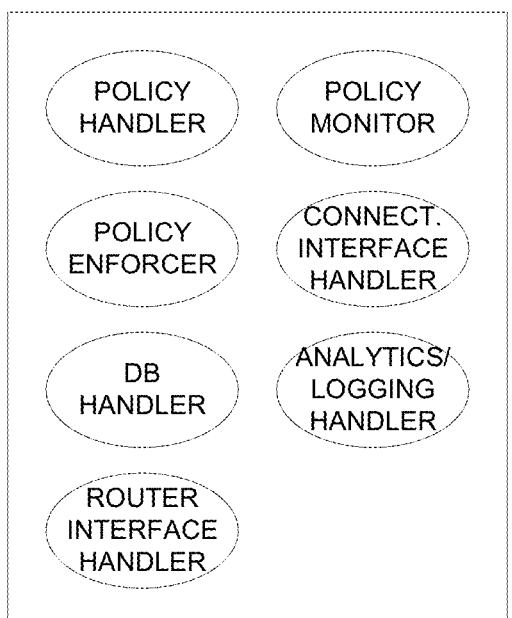

FIG. 17C shows a detailed exemplary embodiment of the policy engine 106. In an exemplary embodiment, the policy engine 106 comprises the following components.

1. Policy handler that operates to add/delete/edit policies for users and enterprise administrators.
2. Policy monitor that monitors based on schedule, location, etc., based on policy.
3. Policy enforcer that handles policy conflicts and enforces based on a policies hierarchy set.
4. Connections interface handler that interfaces with the connections engine component.
5. Router interface handler that interfaces with the router engine component.
6. DB handler that operates to save/retrieve policy related information.
7. Analytics/logging handler that provides analytics and logging for the cognitive policy engine component.

Figure 17D:
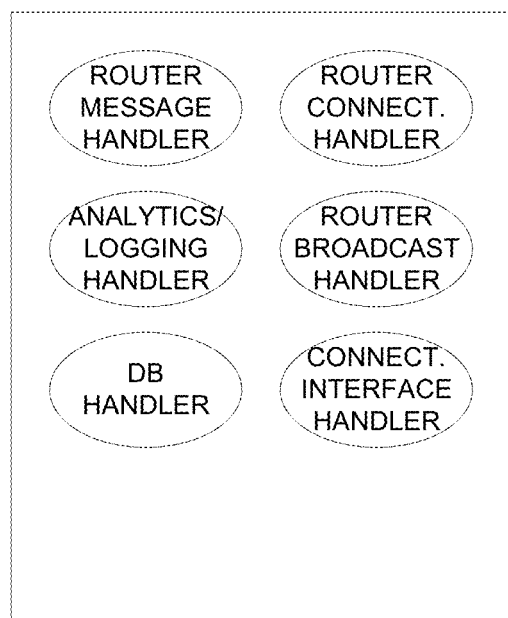

FIG. 17D shows a detailed exemplary embodiment of the router engine 108. In an exemplary embodiment, the router engine 108 comprises the following components.

1. Router message handler that processes messages and posts them to Envite application rooms.
2. Router connections handler that processes messages and post to the respective connections P2P/group rooms.
3. Router broadcast handler that handles broadcast messaging.
4. Connections interface handler that interfaces with the connections engine component.
5. DB handler that operates to save/retrieve Envite rooms and connections related information.
6. Analytics/logging handler that provides analytics and logging for the router analyzer engine module.

Although certain specific exemplary embodiments are described above in order to illustrate the invention, the invention is not limited to the specific embodiments. The function of the Envite system illustrated in the figures can be implemented in hardware circuitry as shown, or in a combination of dedicated hardware circuitry and software, or largely in software. Accordingly, various modifications, adaptations, and combinations of various features of the described embodiments can be practiced without departing from the scope of the invention as set forth in the claims.

What is claimed is:

1. A method for operating a cross-messaging platform to communicate messages between a first user registered on a first messaging platform and a second user registered on a second messaging platform, the method comprising:
    registering, at the cross-messaging platform, the first user;
    establishing a first cross-messaging platform channel and first cross-messaging platform application on the first messaging platform in response to the first user registering at the cross-messaging platform;
    receiving, at the cross-messaging platform, a request from the first user to connect with the second user in response to the first user registering at the cross-messaging platform;

sending, from the cross-messaging platform, an invitation to the second user to connect with the first user in response to receiving the request from the first user to connect with the second user;
registering, at the cross-messaging platform, the second user in response to the second user accepting the invitation;
establishing, at the cross-messaging platform, a second cross-messaging platform channel and second cross-messaging platform application on the second messaging platform in response to the second user registering at the cross-messaging platform;
establishing, by the first cross-messaging platform application and second cross-messaging platform application, a first peer-to-peer (P2P) channel and a second P2P channel respectively; and
establishing, by the cross-messaging platform, message delivery between the first messaging platform and the second messaging platform using the first P2P channel and the second P2P channel respectively, wherein communications between the first and second users occur using the first P2P channel and the second P2P channel.

2. The method of claim 1, further comprising:
searching a database of the cross-messaging platform to find the second user in response to the request; and
returning an indication to the first user that the second user is not in the database.

3. The method of claim 1, further comprising:
identifying the second user as one of an individual or service provider, and
using a location of the first user to determine the service provider identified as the second user.

4. The method of claim 1, further comprising intelligent message forwarding and notifications for the first user based on individual or enterprise forwarding preferences.

5. The method of claim 4, further comprising establishing, by the first user, intelligent message forwarding rules to forward messages to another user or group.

6. The method of claim 1, further comprising availing third party application integrations available on the second messaging platform to the first user on the first messaging platform.

7. The method of claim 1, further comprising leveraging on-demand services associate with the first P2P channel and the second P2P channel without subscribing to those services.

8. A method for operating a cross-messaging platform to communicate messages between a first user registered on a first messaging platform and a second user registered on a second messaging platform, the method comprising:
establishing a first cross-messaging platform channel and first cross-messaging platform application on the first messaging platform in response to the first user registering at the cross-messaging platform;
establishing a second cross-messaging platform channel and second cross-messaging platform application on the second messaging platform in response to the second user registering at the cross-messaging platform;
receiving, at the cross-messaging platform, a request from the first user to find a service;
searching a database of the cross-messaging platform to generate search results that include a plurality of service providers that provide the service;
broadcasting, from the cross-messaging platform, an invitation to the plurality of service providers to provide the service to the first user;
receiving, at the cross-messaging platform, an acceptance of the invitation from a selected service provider that is identified as the second user on the second messaging platform;
establishing, by the first cross-messaging platform application and second cross-messaging platform application, a first peer-to-peer (P2P) channel and a second P2P channel, respectively, in response to receiving the acceptance of the invitation; and
establishing, by the cross-messaging platform, message delivery between the first messaging platform and the second messaging platform using the first P2P channel and the second P2P channel respectively, wherein communications between the first and second users occur using the first P2P channel and the second P2P channel.

9. The method of claim 8, wherein the operation of searching comprises using at least one of artificial intelligence (AI) and natural language processing (NLP) to search the database.

10. The method of claim 8, wherein the operation of searching further comprises searching the database for service providers within a particular geographic area.

11. The method of claim 8, further comprising presenting search results from the operation of searching to the first user.

12. The method of claim 8, further comprising broadcasting messages and unsolicited notifications to subscribed users based on their service or topic of interest.

13. An apparatus that communicates messages between a first user registered on a first messaging platform and a second user registered on a second messaging platform, the apparatus comprising:
means for registering the first user;
means for establishing a first cross-messaging platform channel and first cross-messaging platform application on the first messaging platform in response to the first user registering;
means receiving a request from the first user to connect with the second user in response to the first user registering;
means for sending an invitation to the second user to connect with the first user in response to receiving the request from the first user to connect with the second user;
means for registering the second user in response to the second user accepting the invitation; and
means for establishing a second cross-messaging platform channel and second cross-messaging platform application on the second messaging platform in response to the second user registering at the cross-messaging platform;
means for establishing, by the first cross-messaging platform application and second cross-messaging platform application, a first peer-to-peer (P2P) channel and a second P2P channel respectively; and
means for establishing message delivery between the first messaging platform and the second messaging platform using the first P2P channel and the second P2P channel respectively, wherein communications between the first and second users occur using.

14. The apparatus of claim 13, further comprising:
means for searching a database of the cross-messaging platform to find the second user in response to the request; and
means for returning an indication to the first user that the second user is not in the database.

15. The apparatus of claim 13, further comprising:
means for identifying the second user as one of an individual or service provider, and
means for using a location of the first user to determine the service provider identified as the second user.

16. The apparatus of claim 13, further comprising means for intelligent message forwarding and notifications for the first user based on individual or enterprise forwarding preferences.

17. The apparatus of claim 16, further comprising means for establishing, by the first user, intelligent message forwarding rules to forward messages to another user or group.

18. The apparatus of claim 13, further comprising means for availing third party application integrations available on the second messaging platform to the first user on the first messaging platform.

19. The apparatus of claim 13, further comprising means for leveraging on-demand services associate with the first P2P channel and the second P2P channel without subscribing to those services.

\* \* \* \* \*